United States Patent
Onteddu et al.

(10) Patent No.: US 11,287,785 B2
(45) Date of Patent: Mar. 29, 2022

(54) APPARATUS AND METHOD FOR DISTRIBUTED BATCH CONTROL FOR MODULAR AUTOMATION

(71) Applicant: Honeywell International Inc., Morris Plains, NJ (US)

(72) Inventors: Sivanarayana Onteddu, Horsham, PA (US); Senthilkumar Dhanagopalan, Karnataka (IN); Alicia C. Kempf, Abington, PA (US); Muslim Gulam Kanji, Orefield, PA (US)

(73) Assignee: Honeywell International Inc., Charlotte, NC (US)

( * ) Notice: Subject to any disclaimer, the term of this patent is extended or adjusted under 35 U.S.C. 154(b) by 21 days.

(21) Appl. No.: 16/559,040

(22) Filed: Sep. 3, 2019

(65) Prior Publication Data
US 2021/0063979 A1   Mar. 4, 2021

(51) Int. Cl.
*G05B 19/042* (2006.01)
*G05B 19/418* (2006.01)

(52) U.S. Cl.
CPC .... *G05B 19/042* (2013.01); *G05B 2219/2669* (2013.01)

(58) Field of Classification Search
CPC ............ G05B 19/042; G05B 2219/2669
See application file for complete search history.

(56) References Cited

U.S. PATENT DOCUMENTS

| | | | |
|---|---|---|---|
| 6,909,934 B1 * | 6/2005 | Chang | G05B 19/41865 700/121 |
| 7,613,535 B2 | 11/2009 | Jann et al. | |
| 8,718,807 B2 | 5/2014 | Rudnick et al. | |
| 8,825,189 B2 | 9/2014 | Moore et al. | |
| 2006/0190106 A1 | 8/2006 | Kay et al. | |
| 2009/0125906 A1 * | 5/2009 | Moore, Jr. | G05B 19/41865 718/101 |
| 2010/0106279 A1 * | 4/2010 | Yamamoto | G05B 19/41865 700/105 |
| 2010/0153154 A1 * | 6/2010 | Bergantino | G06Q 10/063 705/7.11 |
| 2016/0252892 A1 * | 9/2016 | Valcore, Jr. | G05B 19/052 700/3 |

FOREIGN PATENT DOCUMENTS

JP   2007233987   *   2/2006   ............ Y02P 90/02

OTHER PUBLICATIONS

Wonderware Recipe Manager Plus Technical Data Sheet, Schneider Electric Software, LLC 2017.

* cited by examiner

*Primary Examiner* — Chad G Erdman
(74) *Attorney, Agent, or Firm* — Paschall & Associates, LLC; James C. Paschall

(57) ABSTRACT

A method and system are provided for distributing master recipes for process control systems comprising storing a single master recipe on a server having an enterprise database and communicating said single master recipe to each of a plurality of manufacturing units. Control recipes are seamlessly created using common master recipes across multiple process plants to deliver consistent product quality with enough flexibility and interoperability in accordance with ISA S88 batch standards.

12 Claims, 5 Drawing Sheets

Single stream structure

APPARATUS AND METHOD FOR DISTRIBUTED BATCH CONTROL FOR MODULAR AUTOMATION

TECHNICAL FIELD

This invention relates generally to control systems as well as to an apparatus and method for batch event delivery in a process control system.

BACKGROUND OF THE INVENTION

Processing facilities are often managed using process control systems. Examples of processing facilities include chemical, food, pharmaceutical, paper, and petrochemical production plants. Among other operations, process control systems typically interact with and control industrial equipment in the processing facilities, such as equipment used to produce chemical, pharmaceutical, food paper, or petrochemical products. Frequently, these or other types of products are manufactured or processed in batches. The process control system typically includes one or more process controllers capable of controlling one or more process elements in a processing facility. Process controller in a batch manufacturing facility is typically implemented as one or more master recipes, responsible for different aspects of the S88 procedural control function. Batch process control operations are characterized by numerous complex interrelationships and constraints which are classified by either variation in product or variation in the physical structure of a process manufacturing plant.

The batch process is characterized by variations in product, such as a single product of the same grade, a single product in multiple grades or multiple products in multiple grades.

A batch process may be characterized by variation in the physical structure of a process manufacturing plants, such as a single stream, parallel streams or multipath. In a single stream structure as shown in FIG. 1, the units are organized serially in a single train where batch moves from one unit to another unit in the predetermined serial order. A parallel structure is like a multiple single stream configuration in which there may be a common raw material and storage areas but otherwise, each stream is isolated from the others. In a multipath structure, the batch execution path does not follow any fixed path where the unit selection is based on the availability of the unit of the type required.

With recent advances in modular automation system and an objective to improve competitiveness and flexibility at the same time, process manufacturing industries are gradually moving towards a new integrated and modular automation approach over a conventional stick-built facility for small sites and a lower complexity level. Modular automation enables designing the systems into individual portable skids or self-contained package units which can contain complete process systems and multiple process skids can be combined to create larger process systems or entire portable plants. Modular automation can increase flexibility in terms of capacity (e.g. by numbering-up or parallelization), product mix (e.g. by exchange of reaction or downstream processing modules following a plug and produce), feedstock and site (e.g. mobility of modules) to accelerate process development and implementation using plug-and-produce devices, thereby reducing investment costs (Capex) and operating expenses (Opex).

When designing batch automation and control in modular automation for standalone skid-based systems, batch processing can be located at unit\skid aligned controller, where the controller can be placed on a skid and moving around the plant. A batch process is defined as a process that leads to the production of finite quantities of material by subjecting quantities of input materials to an ordered set of processing activities over a finite period of time using one or more pieces of equipment. A batch is a limited quantity of goods or material produced in a single manufacturing run as opposed to a continuous manufacturing process. ISA is the International Society of Automation and ISA 88 is a standard that the organization has developed for batch control. Among the basic concepts that are set forth in ISA 88 is that of a recipe which provides a procedure defining what you would like to do. For example, a mixer is to be filled with certain amounts of certain substances, then mixed for a defined period of time followed by emptying the mixer into the next processing equipment. This process complies with a procedural model that breaks down a procedure into unit-procedures, all of which are set forth in the recipe.

Current automation control system strategies in a typical process manufacturing company, such as chemical, food and beverage, pharmaceutical and consumer packaged goods (CPH) companies are organized in accordance with ISA 88 (recipe standards) for the implementation and management of new or modified products. In accordance with ISA 88, recipes are created at various stages of the implementation including general, site-specific, master and control recipes.

In today's competitive global competition, manufacturers are under constant pressure to find opportunities to drive efficiency, productivity, and speed to market to meet the consumer needs coupled with regulatory requirements and product quality. Therefore, manufacturers are looking for solutions to improve competitiveness and flexibility at the same time by applying modularization and standardized process technology based on upcoming 4th industrial revolution (Industry 4.0) for shorter delivery and development times (equals reduced time to market) and a quick adaption of the production set up to changing market and product needs.

In a current batch automation control system, master recipes created using the ISA 88 procedure model are stored in a centralized server-based platform and they are located in single or multiple controller-based platforms using the ISA S88 procedural model for batch production. Server and controller-based solution enable to execute the batch sequences locally using master recipes stored in the server and or controller.

However, in the current systems the master recipes stored in the dedicated centralized server-based batch engine and controller-based batch engine are not accessible to other server-based batch engine and controller-based batch engine to create a control recipe for batch execution in distributed controller environment in modular automation using skid-based plants as shown in the below image (FIG. 4). This can be cumbersome and inefficient to the appropriate plant administrative personnel if the master recipe is an executable control recipe that is loaded on a single server-based batch engine and the controller-based engine fails or require updates or migration while recipe management is needed.

To use the same master recipe in other server-based platforms and controller-based platforms, the selected master recipe needs to be duplicated using the copy procedure and store it with a different tag name which is not the same true copy guaranteed to always be in sync with the original master recipe. Any unexpected or subsequent changes to the duplicated master recipes imply an enormous amount of work that will need to be completed, because the duplicated master recipes may need to be qualified again. Therefore, without having a one single true master recipe across multiple server-based platforms and controller-based platform, each residing on a separate dedicated unit, manufacturers cannot do class-based recipe implementation to build a single master recipe against a group of similar units and instantiate multiple instances at run-time.

Furthermore, to minimize the peer to peer communication network bandwidth, master recipes must then be stored in the same controller to execute the batch on the associated unit(s), where master recipes stored in a centralized server or the controller cannot be used to create control recipes in distributed controllers in modular automation using skid-based plants as shown in the below image (FIG. 4). Due to this limitation, the same master recipes need to be duplicated in the controller or distributed using peer to peer mechanism which requires additional engineering and qualification efforts and creates network bandwidth causing problems in mission-critical systems.

Having a single master recipe that can be distributed across multiple controllers, each dedicated to a unit in modular automation allows for distributed class-based batch execution that has unit procedure, operations and phases for a particular unit running on a dedicated controller and the same master recipes can be used on another dedicated unit controller that is of the same unit class. This combines the benefits of controller-based class-based batch execution with the advantages of the distributed batch control architecture to quickly and efficiently adapt to new recipes resulting from customer requirements.

In a typical prior art connected regulated batch process manufacturing environment, the amount of data and time spent to collect the data required for regulatory compliance mandates to ensure that even the same master recipe is used to duplicate across controllers in a distributed control system. In a typical connected batch process manufacturing environment, regulatory compliance is mandated to ensure the recipe data is complete, consistent, and accurate, even with the same master recipe cloned and used across multiple controllers in the same plant to produce the same product. In such cases, to get the approval from regulatory compliance, the amount of data being collected and the efforts spent to verify each recipe adds further delays to manufacture and release of a product until all documents had been reviewed.

In addition, the cost and effort required to analyze and validate the data for regulatory compliance, where the customized processes become more complex to consider all relevant process operations data in the analysis, can lead to inadequate reviews and erroneous decisions.

Therefore, transferring a viable and verified master recipe from one controller to multiple controllers requires significant, time-consuming verification effort to ensure integrity. This is made more challenging if the controllers and units are in different areas of the plant network which further minimizes modularization and flexibility in terms of scalability (e.g. by numbering-up or parallelization). These restrictions create a barrier in the process of transforming the manufacturing industry from centralized (classical) process control system to a distributed (modular) process control system.

In U.S. Pat. No. 8,718,807 B2, there is disclosed a method including initializing, at a first controller, at least one process step of a control recipe from a master recipe associated with a batch process in response to detection of an event associated with the batch process. Although the remote server described in the patent and other references can store and load a master recipe to a targeted controller, the remote server does not allow one to use a single master recipe to load to multiple unit-based controllers distributed across remote locations in modular automation for ski-based plants. In this prior art system, in order to use the same master recipes across multiple controllers dedicated for each unit to create controller recipes, given master recipe must be duplicated based on the number of unit-based controllers and store those in the remote server and assign and load the master recipes to each controller with a different tag name and thus cannot be used for class-based recipe management and execution. The present invention eliminates the duplication of the master recipe and the validation effort that allows using the same master recipe across multiple controllers for manufacturing the single product in the parallel stream and multipath plants. The methodology mentioned in the present invention eliminates the need for managing multiple recipe configuration databases per manufacturing unit\areas of a distributed process control system.

The methodology in prior art references enforces to assign and load the master recipe configuration to associated with controller prior to batch production creation. However, this is not required in the present invention. In our invention, the remote server automatically loads the required master recipes from its enterprise batch database into the targeted distributed controller execution environment or the server-based batch execution environment based on the selected unit(s) and generate control recipes.

In the mentioned references, the master recipes loaded to controller remain the controller although the master recipes are not used to create the batches.

SUMMARY OF THE INVENTION

An embodiment is a method of distributing master recipes for process control systems comprising storing a single master recipe on a server having an enterprise database and communicating said single master recipe to each of a plurality of manufacturing units. The single master recipe may be removed from each of the plurality of manufacturing units after batch operations are completed. The master recipe is automatically downloaded to a controller for each manufacturing unit within a process manufacturing plant. The single master recipe may be a single reference for master recipe definition. The master recipe may be loaded from the enterprise database into a targeted distributed controller execution environment. The master recipe is loaded from said enterprise database into a server-based batch execution environment. The master recipe may be reused over multiple process plants.

Another embodiment of the invention is a control system for a production operation comprising a database containing a qualified mater recipe wherein said master recipe is a single reference for batch production in a distributed process control system. The master recipe is a single reference for batch production to controllers configured in a same or different manufacturing areas. The master recipe may be stored in an enterprise batch database. The database is in communication with at least one controller. The modular batch control system may be configured to automatically load said master recipe from an enterprise batch database into controllers of at least one manufacturing unit. The controllers may be configured to generate control recipes for batch production for at least one manufacturing unit. The control recipes may be created using said master recipes across multiple process plants.

DETAILED DESCRIPTION OF THE INVENTION

Figure 1:
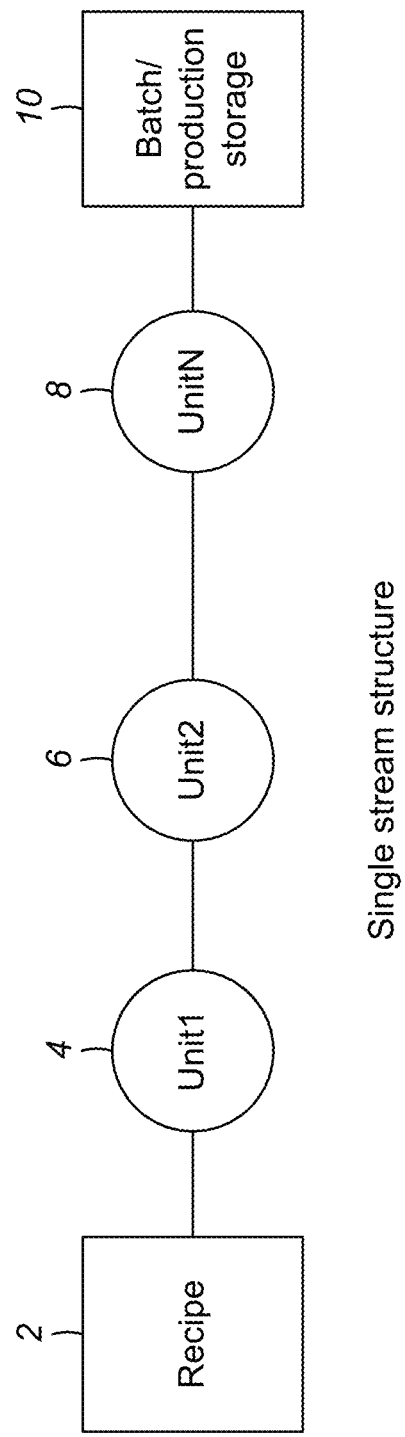
FIG. 1 shows a single stream structure for batch production.

In the present invention, associated mastered recipes are automatically deleted from the controller at the completion of batch production that can free the controller resources.

In the mentioned reference, cloned master recipes need to manually transfer between dedicated remote servers associated with a manufacturing site, which requires additional verification effort to ensure the data integrity.

The present invention eliminates the need to duplicate the master recipes using enterprise batch database and automate the load process that eliminates the human error by automatically downloading the master recipe to the controller.

The present invention provides an opportunity to distribute the master recipes across the process manufacturing plant and eliminates duplication and manually transfers the master recipes to each individual controller in a distributed (or modular) process control system and reduces the effort and costs to meet the regulatory compliance requirements.

There are numerous technical advantages provided by the present invention. The Enterprise recipe operational database supports faster new product introductions with less engineering effort by a continuing number of recipe changes, distributed production facilities. The Enterprise recipe operational database can be used as a single reference for master recipe definition to support better regularly compliance. There is provided easier integration of batch applications in modular automation, where individual skids can contain a complete process system or multiple process skids can be combined to create a large distributed control system environment using portable plants. There is easier integration of batch control system into larger manufacturing networks that allows transferring the same master recipe information to consistently manufacture products across manufacturing facilities in the distributed control system environment. It is easier to distribute master recipes across multiple controllers configured at multiple plant sites by removing restrictions to locate master recipes and units in the same controller. Another key benefit is to quickly and efficiently adapt and scale the recipes resulting from a change in customer and plant requirements. These recipes can be distributed to single and multiple server-based batch engine and controller-based batch engines with a reduced scope of loss and easier migration. When one controller goes down, the scope of the loss is limited to a single unit and will not impact batch production on other units. It also allows easier migrations since there is usually sometimes a single unit is not in use when it could be migrated independently and not affecting batch production on other units.

There is a reduction in peer to peer communication network bandwidth on the controllers. In addition, there is a reduction of rework and duplication of effort for regulatory compliance by using a standardized process across multiple process manufacturing plants.

In addition, there are business advantages and technical differentiators from the prior art systems. With the current invention, there is reduced time to develop and validate master recipes by eliminating the need to duplicate and transfer the master recipe application for manufacturing the single product in the parallel stream and multipath plants. There is a reduction in time to market by reducing the time to manually transform the master recipes that are consistent across manufacturing facilities. This invention enables modularized flexibility to create batches in parallel and multipath manufacturing units to scale the production based on changing the market and product needs. Improving the speed and efficiency of the product by use of the same recipe structure across all units using a distributed control system.

The present invention enables one to store qualified master recipes configured in accordance with the required ISA 88 procedural model using authoring tools in the enterprise batch database. The master recipes stored in the Enterprise batch database is not assigned and not loaded to any specific controller and it is common for all controllers configured in same or different manufacturing unit\areas of a distributed process control system. This methodology does not enforce to load the master recipe configuration to batch execution environment prior to batch production creation. This methodology enables to store the qualified common master recipes across the process manufacturing plant. Also, this eliminates the need for managing multiple recipe configuration databases per manufacturing unit\areas of a distributed process control system. The unit classes associated with the distributed control system created using in accordance with ISA 88 physical model are published to the enterprise batch database.

Upon creation of a batch production on the selected unit(s), the proposed solution automatically loads all the required master recipes from the enterprise batch database into the targeted distributed controller execution environment or the server-based batch execution environment based on the selected unit(s) to generate control recipes. The control recipes and associated mastered recipes are deleted from the controller at the completion of batch production.

Figure 5:
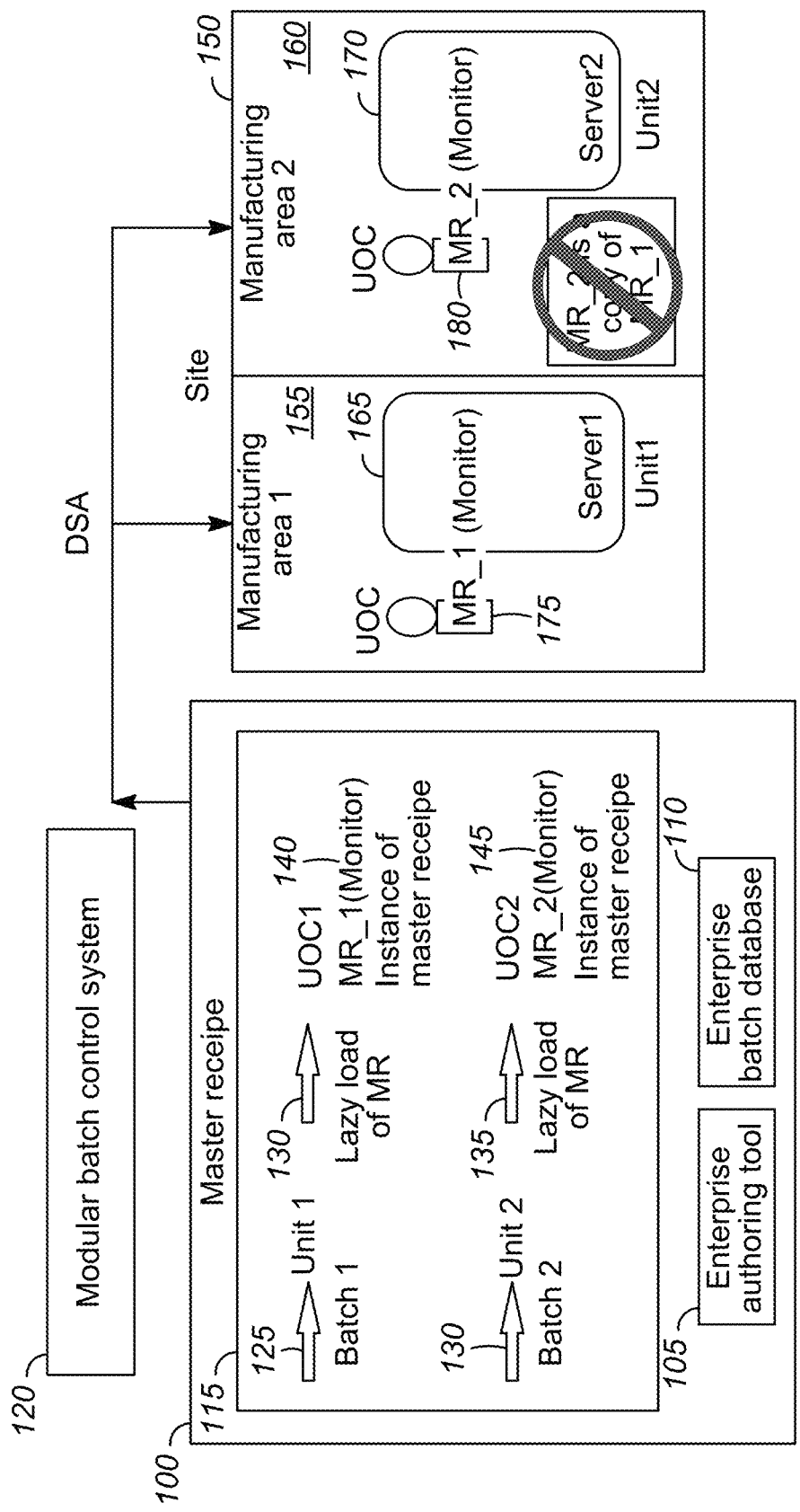
FIG. 5 shows a batch manufacturing operation with a master recipe retained in an enterprise batch database.

The present invention enables a common methodology to seamlessly reuse the common master recipes across multiple process plants to deliver consistent product quality with enough flexibility and interoperability in accordance with ISA S88 batch standards. The enterprise batch server hosting the enterprise batch database can operate at the enterprise or MES layer in accordance with ISA S95 standards. This enterprise layered configuration supports seamless connectivity across the distributed manufacturing areas to upload and download the common master recipe configuration and eliminate the overhead of managing multiple copies of the same master recipe as shown in FIG. 5.

In some embodiments, various functions are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document.

The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "process controller" means any device, system, or part thereof that controls at least one operation. Process controllers are capable of controlling one or more process elements in a facility. Process controller in batch manufacturing environment are typically implemented as one or more master recipes, responsible for different aspects of the S88 procedural control function.

A controller may be implemented in hardware, firmware, software, or some combination of at least two of the same. The functionality associated with any particular controller may be centralized or distributed, whether locally or remotely.

FIG. 1 shows an example of a single stream structure in which there is a master recipe 2 retained in memory that needs to be communicated to the three units 4, 6 and 8 shown in series so that batch production 10 can proceed. The product from batch production may be stored or shipped at this point.

Figure 2:
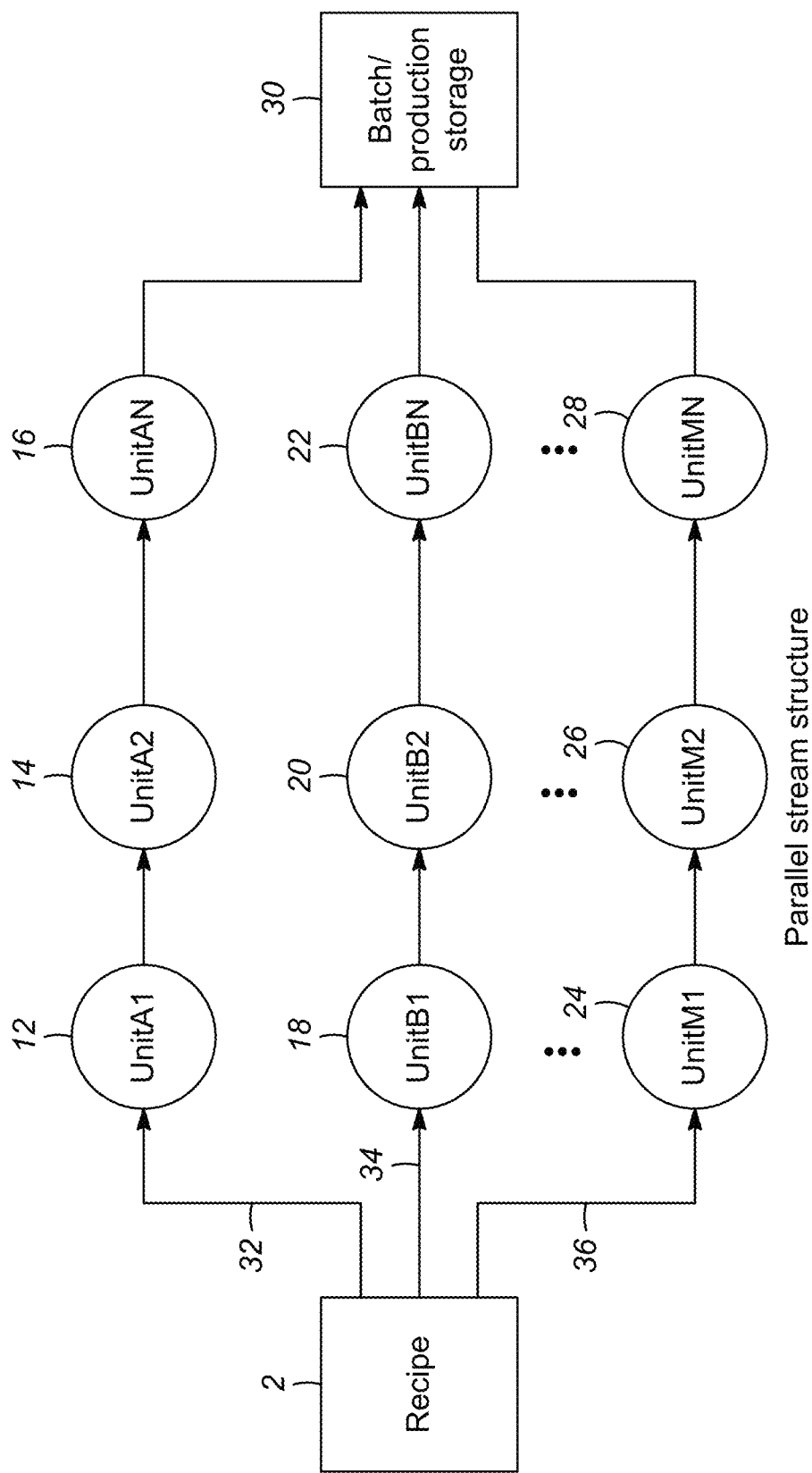
FIG. 2 shows a parallel stream production structure for batch production.

FIG. 2 shows a parallel stream production with three parallel streams 32, 34 and 36 having three units each 12, 14 and 16; 18, 20 and 22 and 24, 26 and 28 respectively with a master recipe 2 being sent in parallel to the units. As in the single stream production, this is a batch production of a product with a product being produced that may be shipped or stored 30 for future use or shipment.

Figure 3:
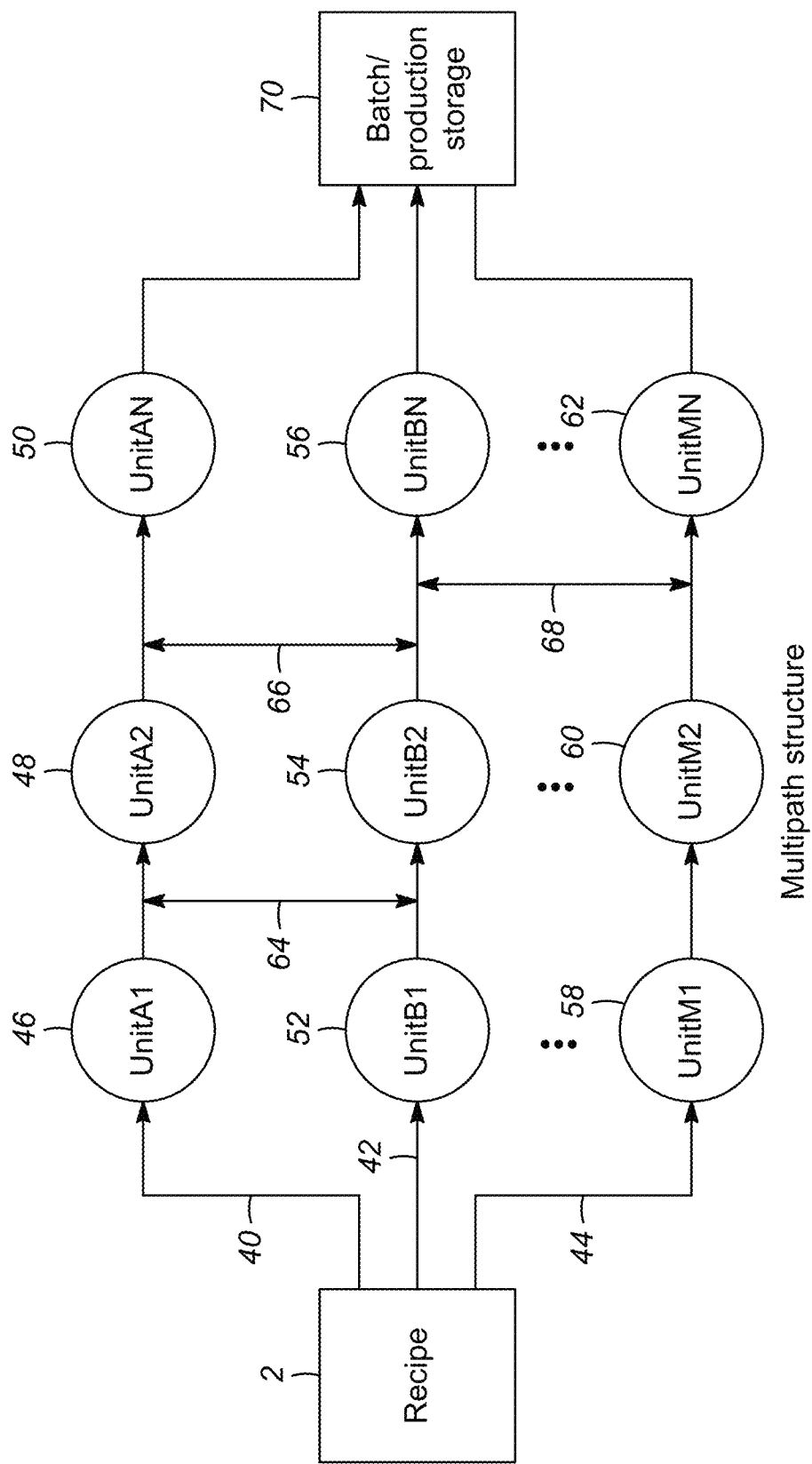
FIG. 3 shows a multipath stream production structure for batch production.

FIG. 3 shows a multipath production structure with the same recipe 2 for which instructions are sent to the units 46, 48, and 50; 52, 54 and 56 and 58, 60 and 62 on each of three paths 40, 42 and 44 to produce a product 70. The difference from the parallel stream production of FIG. 2 is that there is greater flexibility for a product from a particular unit to be sent to a unit in a different path such as through paths 64, 66 and 68 rather than continuing in sequence to the next unit in the current path. This allows for better utilization of all units and potential for greater production compared to the parallel path process.

Figure 4:
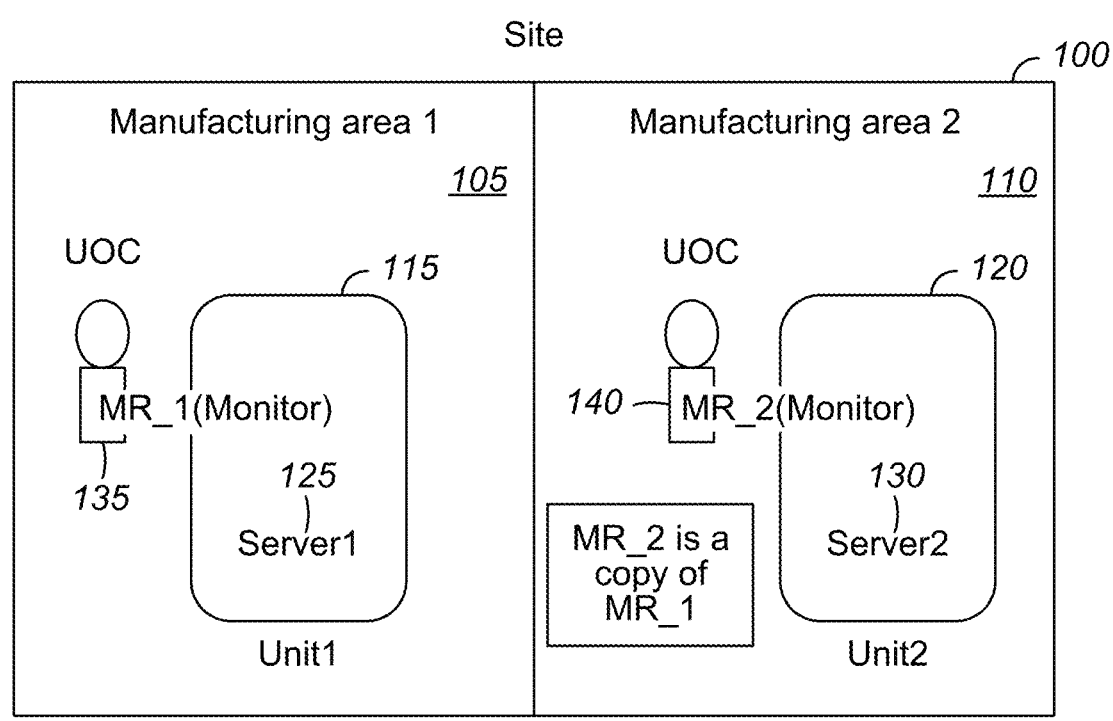
FIG. 4 shows a manufacturing site with two manufacturing areas.

FIG. 4 shows a manufacturing site 100 with two manufacturing areas 105 and 110 within the site. On manufacturing area 105 is shown unit 115 with server 115 and master recipe 135 stored in the unit operation controller for batch production. On manufacturing area 110 is shown unit 120 with server 130 is a parallel structure as manufacturing area 105 which there may be a common raw material and storage areas but otherwise, each stream is isolated from the others as shown in FIG. 2 and FIG. 3. enables to create batches in parallel and multipath manufacturing units to scale the production based on changing the market and product needs in distributed controller environment in modular automation using skid-based plants as shown in the below image (FIG. 4).

Due to the mentioned limitations in the prior art, Master recipe 135 stored in unit operation controller of manufacturing area 105 is not accessible and cannot be used to create a control recipe for batch production in manufacturing area 110 using unit 120.

To use the same master recipe 135 in manufacturing areas 105 and 110 simultaneously using unit 115 and 120 to produce batches in parallel to scaleup the production, the selected master recipe 135 needs to duplicate using the copy procedure and store it with a different tag name and assign to the controller dedicated to the unit 115 in manufacturing area 105. Though the master recipe 135 is qualified and approved to produce batches, it cannot be used to across all the unit operations controllers distributed modular automation using skid-based plants as shown in the below image (FIG. 4). Since the master recipe to use in manufacturing area 110 is not the same true copy as original approved master recipe 135, the master recipe xxx needs to qualify and approve again to use it for batch production. So, without having a one single true Master Recipe across multiple server-based platforms and controller-based platform each residing on a separate dedicated unit, manufactures cannot do class-based recipe implementation to build a single master recipe against a group of similar units and instantiate multiple instances at run-time.

FIG. 5 shows the current disclosure showing server 100 in which a qualified master recipe 130 is stored in enterprise batch database 110 after being configured using enterprise authoring tool 105 within modular batch control system 120. The master recipe 130 stored in the enterprise batch database 110 is used as a single reference for batch production to facilitate the automatic transformation to the controllers configured in same or different manufacturing areas of a distributed (modular) process control system. Enterprise authoring tool 105 is used to create master recipes and unit classes to support automatic master recipe download to the unit associated controllers during batch execution.

The modular batch control system 120 operate within the existing distributed control system network and security infrastructure needed to seamlessly to transform a single master recipe into distributed controllers automatically while reducing recipe duplication. The computing infrastructure to automate the recipe transformation follows the current distributed control system industry-standard practices.

In this approach, master recipe 130 exist in the enterprise batch database 110 is not required to store in each controller prior to batch execution. In this figure, the master recipe 130 is retained in the enterprise batch database and only communicated as needed to the individual Batch execution controller as opposed to the prior art systems where a copy needs to be sent to each Batch execution controller.

On creation of batch 125 and 130 using master recipe 130 using units 165 and units 170 of same or different manufacturing areas in the distributed modular automation control system, the modular batch control system 120 automatically load the master recipe instances of master recipe 130 from the enterprise batch database into the controllers of units 165 and units 170. On batch execution, the controller generates control recipes for batch production using units 165 and units 170. Also, the control recipes and mastered recipe instances of master recipe 130 are deleted from the controller at the completion of batch production. Finally, control recipes are seamlessly created using the common master recipes across multiple process plants to deliver consistent product quality with enough flexibility and interoperability in accordance with ISA S88 batch standards.

Specific Embodiments

While the following is described in conjunction with specific embodiments, it will be understood that this description is intended to illustrate and not limit the scope of the preceding description and the appended claims.

A first embodiment of the invention is a method of distributing master recipes for process control systems comprising storing a single master recipe on a server having an enterprise database and communicating the single master recipe to each of a plurality of manufacturing units. An embodiment of the invention is one, any or all of prior embodiments in this paragraph up through the first embodiment in this paragraph wherein the single master recipe is removed from each of the plurality of manufacturing units after batch operations are completed. An embodiment of the invention is one, any or all of prior embodiments in this paragraph up through the first embodiment in this paragraph wherein the master recipe is automatically downloaded to a controller for each manufacturing unit within a process manufacturing plant. An embodiment of the invention is one, any or all of prior embodiments in this paragraph up through the first embodiment in this paragraph wherein the single master recipe is a single reference for master recipe definition. An embodiment of the invention is one, any or all of prior embodiments in this paragraph up through the first embodiment in this paragraph wherein the master recipe is loaded from the enterprise database into a targeted distributed controller execution environment. An embodiment of the invention is one, any or all of prior embodiments in this paragraph up through the first embodiment in this paragraph wherein the master recipe is loaded from the enterprise database into a server-based batch execution environment. An embodiment of the invention is one, any or all of prior embodiments in this paragraph up through the first embodiment in this paragraph wherein the master recipe is reused over multiple process plants.

A second embodiment of the invention is a control system for a production operation comprising a database containing a qualified mater recipe wherein the master recipe is a single reference for batch production in a distributed process control system. An embodiment of the invention is one, any or all of prior embodiments in this paragraph up through the first embodiment in this paragraph wherein the master recipe is a single reference for batch production to controllers configured in a same or different manufacturing areas. An embodiment of the invention is one, any or all of prior embodiments in this paragraph up through the first embodiment in this paragraph wherein the master recipe is stored in an enterprise batch database. An embodiment of the invention is one, any or all of prior embodiments in this paragraph up through the first embodiment in this paragraph wherein the database is in communication with at least one controller. An embodiment of the invention is one, any or all of prior embodiments in this paragraph up through the first embodiment in this paragraph wherein the a modular batch control system is configured to automatically load the master recipe from an enterprise batch database into controllers of at least one manufacturing unit. An embodiment of the invention is one, any or all of prior embodiments in this paragraph up through the first embodiment in this paragraph wherein the controllers are configured to generate control recipes for batch production for at least one manufacturing unit. An embodiment of the invention is one, any or all of prior embodiments in this paragraph up through the first embodiment in this paragraph wherein the control recipes are created using the master recipes across multiple process plants.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method of distributing master recipes for process control systems comprising:
   storing a single master recipe on a server having an enterprise database;
   communicating said single master recipe to each of a plurality of manufacturing units, wherein said single master recipe is loaded from said enterprise database into multiple controllers associated with the process control systems, wherein each controller is dedicated to a unit in modular automation that includes unit procedure, operations and phases for the particular unit running on the dedicated controller to allow for distributed class-based batch execution in the process control systems; and
   communicating, said single master recipe to another dedicated unit controller that is of the same unit class.

2. The method of claim 1 wherein said single master recipe is removed from each of said plurality of manufacturing units after batch operations are completed.

3. The method of claim 1 wherein the single master recipe is automatically downloaded to the controller for each manufacturing unit within a process manufacturing plant.

4. The method of claim 1 wherein said single master recipe is a single reference for master recipe definition.

5. The method of claim 1 wherein said single master recipe is loaded from said enterprise database into a server-based batch execution environment.

6. The method of claim 1 wherein said single master recipe is reused over multiple process plants.

7. A control system for a production operation comprising:
   a database containing a master recipe wherein said master recipe is a single reference for batch production in a distributed process control system,
   wherein said master recipe is loaded from said enterprise database into multiple controllers associated with the process control systems, wherein each controller is dedicated to a unit in modular automation that includes unit procedure, operations and phases for the particular unit running on the dedicated controller to allow for distributed class-based batch execution in the process control systems, and wherein the controller is configured to communicate said single master recipe to another dedicated unit controller that is of the same unit class.

8. The control system of claim 7 wherein said master recipe is a single reference for batch production to controllers configured in a same or different manufacturing areas.

9. The control system of claim 7 wherein said master recipe is stored in an enterprise batch database.

10. The control system of claim 7 wherein said database is in communication with at least one controller.

11. The control system of claim 9 wherein a modular batch control system is configured to automatically load said master recipe from the enterprise batch database into controllers of at least one manufacturing unit.

12. The control system of claim 10 wherein said controllers are configured to generate the control recipes for batch production for at least one manufacturing unit.

* * * * *